May 5, 1931. F. VON MADALER 1,803,572
SYNCHRONOUSLY OPERATED MOTION PICTURE AND SOUND REPRODUCTION APPARATUS
Original Filed Dec. 6, 1928    3 Sheets-Sheet 1
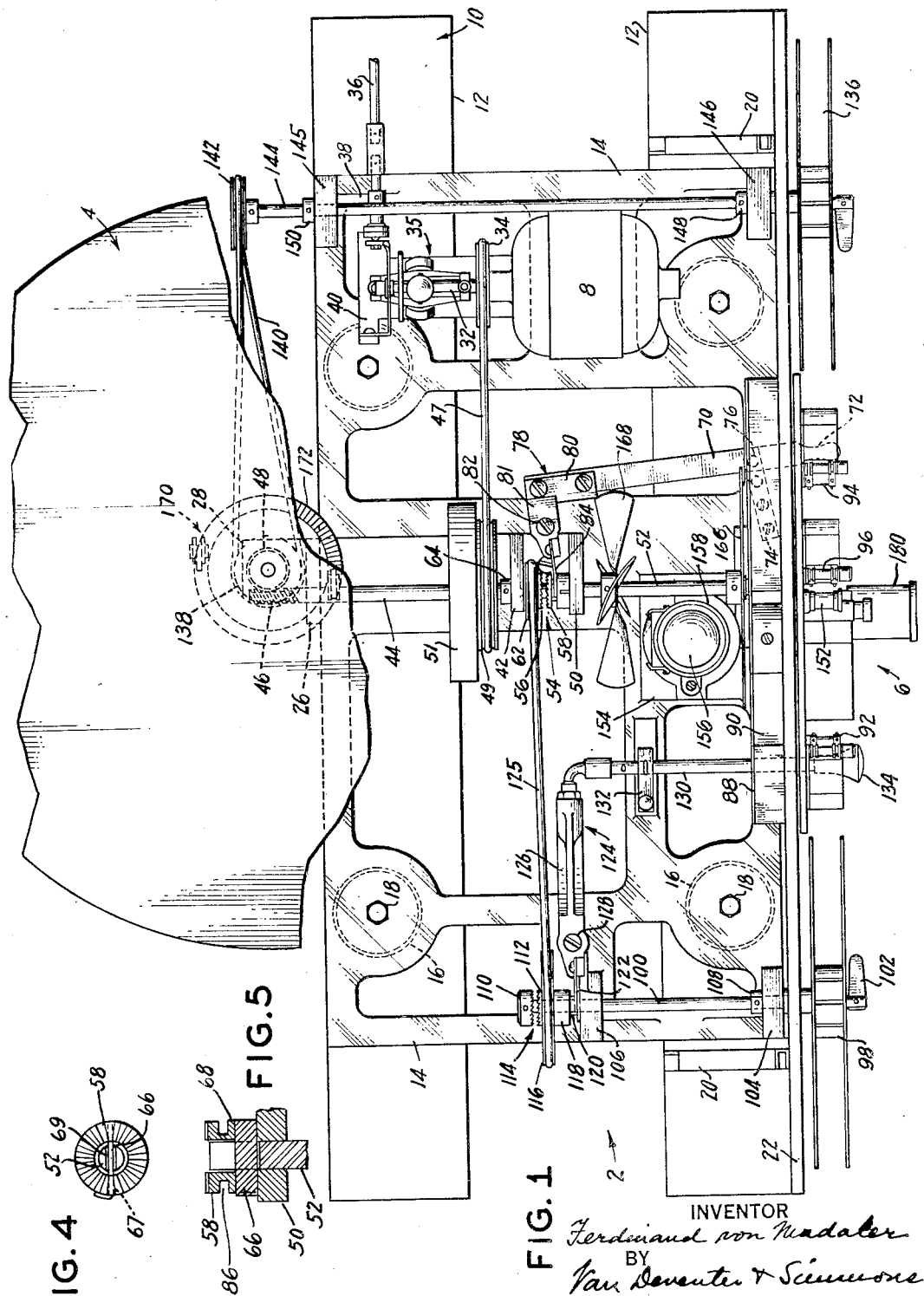
INVENTOR
Ferdinand von Madaler
BY
Van Deventer & Simmons
his ATTORNEYS May 5, 1931. F. VON MADALER 1,803,572
SYNCHRONOUSLY OPERATED MOTION PICTURE AND SOUND REPRODUCTION APPARATUS
Original Filed Dec. 6, 1928 3 Sheets-Sheet 2
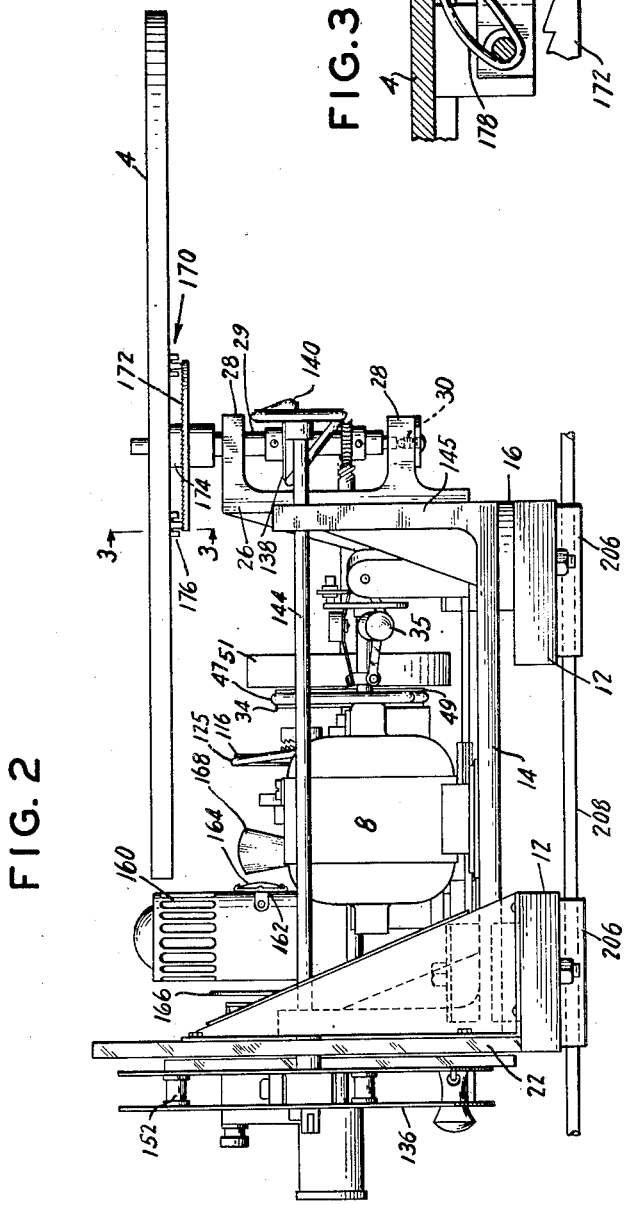

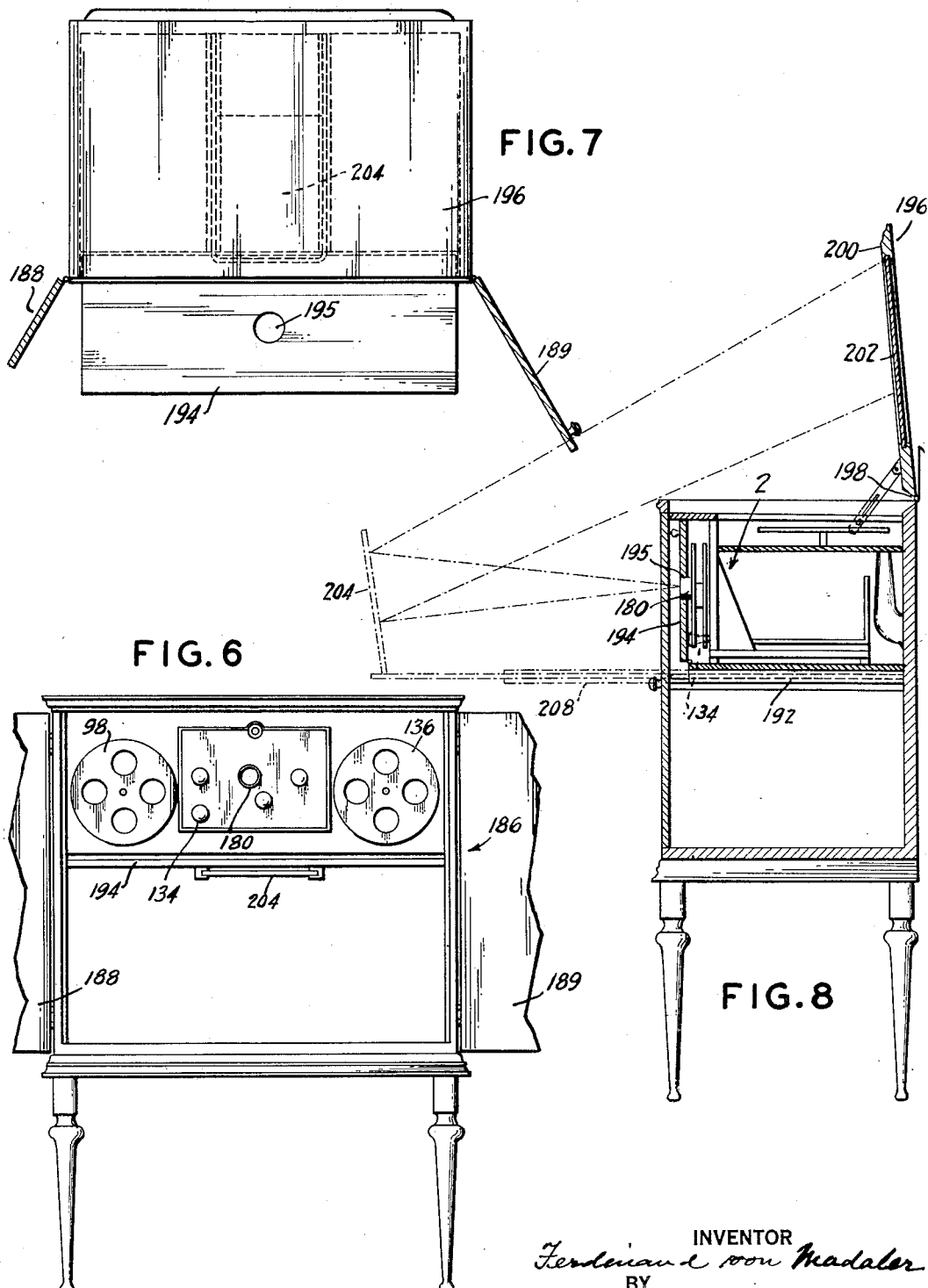

Patented May 5, 1931

1,803,572

UNITED STATES PATENT OFFICE

FERDINAND von MADALER, OF HAMPTON BAYS, NEW YORK, ASSIGNOR, BY MESNE ASSIGNMENTS, TO VISIONOLA MFG. CORPORATION, OF NEW YORK, N. Y., A CORPORATION OF DELAWARE

SYNCHRONOUSLY-OPERATED MOTION-PICTURE AND SOUND REPRODUCTION APPARATUS

Application filed December 6, 1928, Serial No. 324,071. Renewed July 22, 1930.

This invention relates to synchronously operated motion picture projection and sound reproduction apparatus.

It is an object of this invention to provide a combined motion picture projection and sound reproduction apparatus in which the entire operating portion of the device is mounted on a single base or chassis, to facilitate the assembly of said apparatus in relation to an ornamental cabinet, or a cabinet provided with suitable sound board devices for use in conjunction with the sound reproduction apparatus.

It is a further object of this invention to provide an assembly of the type described, in which the several parts thereof are easily accessible for repairs or replacements.

It is a further object of this invention to provide a combination motion picture projector and sound reproducer, in which, if desired, the sound reproducer may be operated independently of the motion picture projector.

It is a further object of this invention to provide, in apparatus of the type described, a sound reproducer which is, at all times, in operative connection with the common drive means for the motion picture projector and the sound reproducer, so that, although the motion picture projector be operated without using the sound reproducer, still the effect of the projector will not be spoiled, to any appreciable degree, since the sound reproducer is noiselessly operated.

It is a further object of this invention to provide, in a combination of the type described, a mechanism which can be used for rewinding the film used in the apparatus, without the necessity of removing the film from the housing in which the projection apparatus is mounted.

It is a further object of this invention to provide mechanism for preventing the accidental tearing or ripping of a film, due to operation of the feeding drive simultaneously with the rewinding drive, after the film has been threaded through the machine, and the machine has been placed in readiness for the projection operation.

It is a further object of this invention to mount, together with a sound reproducer to be used in conjunction with a motion picture outfit, a light source for the motion picture outfit, which, while completely housed within the cabinet with which it is intended to mount the combination sound and motion picture apparatus, still is easily removable and replaceable, without disturbing any one of the other parts of the apparatus.

It is a further object of this invention, in this connection, to provide novel drive means for the film reels, of motion picture apparatus of the type described, so that one of the reels can be constantly driven in one direction, while the other may be driven in either direction, with consequent use of the constantly driven reel, either for taking up film, fed through the apparatus during the projection operation, or to provide the necessary tension, when the rewinding operation is taking place.

It is a further object of this invention to provide a unitary assembly of the type herein described which is capable of being easily fitted into and removed from a cabinet as a completely assembled unit, and which lends itself to ease in manufacture and testing.

It is an additional object of this invention to provide, in apparatus of the type described, a device of simple construction, which is easily assembled, cheaply manufactured, and which, when assembled, is easily and simply operated by anyone, without the necessity of prior knowledge, skill, or the like.

Certain features of novelty, shown and described herein, are shown, described, and claimed in my copending applications, Serial Nos. 324,072, 324,073 and 324,074, filed concurrently herewith, and therefore are not claimed herein.

With the exception of the objects of invention set forth in said copending applications, other objects of the invention described herein will in part be obvious and in part be hereinafter pointed out.

The invention accordingly consists in the features of construction, combinations of elements, and arrangement of parts which will be exemplified in the constructions hereinafter described, and of which the scope of application will be indicated in the following claims.

In the accompanying drawing, in which is shown one of the various possible illustrative embodiments of this invention.

Fig. 1 is a plan view of an assembly into which has been embodied, the invention herein involved parts being broken away to amplify the disclosure.

Fig. 2 is an end elevational view, taken at the right hand end of the construction shown in Fig. 1.

Fig. 3 is a detail sectional view on the line 3—3 of Fig. 2, illustrating the construction of the drive for the sound reproducer table, used in this invention.

Figs. 4 and 5 are plan and vertical sectional views of a detail of the drive connection for the motion picture apparatus of my invention.

Fig. 6 is a front elevational view of a cabinet with which has been mounted an assembly embodying my invention.

Fig. 7 is a plan view of the construction shown in Fig. 6, the doors of the cabinet being shown swung open and down.

Fig. 8 is a side elevational view in partial section illustrating the arrangement of a system mirror and a screen in conjunction with the cabinet in the carrying out of the invention.

In the embodiment of the invention, which is disclosed upon the drawings, a chassis 2 is seen to have mounted thereon all the mechanical elements of the sound reproducer and motion picture projection outfit, which it is intended to combine for synchronous operation. The sound reproducer, here represented by the record carrier, or turn-table 4, and the projection apparatus 6, are arranged on chassis 2 for compactness, but in such manner that the parts of each unit are readily accessible, as will appear from the disclosure hereinafter set forth. A single power source is provided for the operation of both units, and their various parts, and is seen to comprise, in this instance, an electric motor 8, which, by suitable shafting and gearing, hereinafter described, may be coupled to drive the units, either for individual operation, or for joint operation, at the option of the one using the arrangement.

The chassis 2 includes a base 10, consisting of a number of longitudinally extending slats 12, which may be made of any desired material, preferably metal. Suitably mounted upon the slats 12 and retained in secured position thereon, is the base casting 14, which constitutes the main positioning means for the devices of the combined units, as hereinafter set forth. Between slats 12 and casting 14 are positioned the sponge rubber pads 16, which, together with casting 14 and slats 12, are secured relatively by any desired securing means, such as the bolt and nut arrangement 18. Casting 14 is cored out in the customary manner for the purposes of producing a member of desired lightness, without sacrificing the strength necessary for the purposes for which the base is intended.

Secured at one side of casting 14 and retained in fixed relation thereto by means of brackets 20, mounted upon the slats 12 adjacent said side of the casting 14, is an upright face plate or panel 22. Panel 22, as hereinafter appears, carries substantially all the controls of the combined apparatus, as well as providing the supporting medium for practically the entire projector apparatus.

Preferably formed integrally with base casting 14, and extending upwardly therefrom at the side thereof opposite that upon which the panel 22 is mounted, is the vertical bearing member 26, the extending bosses 28 of which are suitably bored in alignment to provide bearings for the vertically disposed shaft 29, with respect to the upper end of which, the turn-table 4, is mounted, in the manner hereinafter appearing. The lower end of shaft 29 may be supported in any suitable step bearing 30.

Positioned at one end of the casting 14, and secured thereto in any preferred manner, is the motor 8, preferably positioned so that the shaft 32 thereof will extend substantially transversely of the casting 14. Upon shaft 32 are carried the drive pulley 34 and the governor mechanism 35. Governor mechanism 35 may be of any preferred construction, as, for instance, devices in which the inertia of a set of weights is used to apply a braking force against the face of a plate. Said plate may be adjustably mounted so that the effectiveness of the braking action, may be increased or decreased, as by the manipulation of an adjusting shaft 36, which extends through a suitably positioned upright 38. A bearing is thus provided with respect to the wall of a cabinet, if desired, so that the shaft 36 may be extended, therethrough to receive some type of ornamental knob, or the like, in keeping with the cabinet, or other arrangement with which chassis 2 is to be associated. The governor mechanism 35 may be carried by a support 40 mounted upon the base casting 14. However, the particular details of the governor, or of the type of governor, do not enter into the specific invention involved herein to such an extent that specific description thereof is necessary. Any device which necessarily controls the motor speed, or the speed transmitted to the pulley 34, would provide the elements necessary for this disclosure.

Mounted substantially parallel to the shaft 32 of motor 8, and carried within bearings formed in an upright 42, and the vertical bearing member 26, is the shaft 44. The upright 42 may be mounted upon casting 14, or, if desired, formed integrally therewith. The end of shaft 44 which extends through the bearing member 26 is formed as, or provided with, a worm 46, engaging a worm gear 48, positively pinned or otherwise secured to the shaft 29. It is thus seen that shaft 29 will be constantly driven when the motor 8 is operating, without regard to the other elements which may be connected to, or disconnected from said motor, since the governor mechanism 35 will operate to maintain the motor at constant speed, no matter what the load placed thereon. Of course, some sort of motor, which, in itself, operates between narrow limits of variation in speed, according to the load imposed, is to be used in such a combination, in order that governor mechanism 35 should be capable of applying sufficient friction to cut down the speed of said motor for the purposes desired. Driving connection between shafts 32 and 44 is had by a belt 47, carried from pulley 34 to a suitably aligned pulley 49 on shaft 44. It is noted that, for the purposes of producing a constant speed device, pulley 49 may be formed with, or there may be positioned on shaft 44, a fly wheel portion 51, to operate in the ordinary manner of such devices.

Mounted in alignment with the shaft 44, and carried in a suitably placed upright 50 is the projector drive shaft 52. Shafts 44 and 52 are provided with a clutch 54, here seen to consist of the members 56 and 58, each having a serrated face, formed for interfitting relation, so that, when pressed into contact, they will provide a positive, unidirectional drive. The member 56, mounted upon shaft 44, may have integrally formed therewith, or otherwise secured relatively thereto, a pulley 62. Said pulley 62, together with a collar 64, secured to shaft 44 on the side of upright 42 opposite the pulley 62, serves to position shaft 44 positively against any end play.

Member 58, however, is mounted upon shaft 52 for substantial movement parallel to the shaft, so that clutch 54 may be made operative. It is necessary to make the connection between member 58 and shaft 52 positive, and also to provide against chattering that would necessarily arise from the use of a device in which the load momentarily increases and decreases, as hereinafter appears. For this purpose a novel connecting means is provided, and consists of a spring plate 66, inserted through a slot 67 formed in the collar portion 68 of member 58 and through an alignable slot 69 through shaft 52. It is to be understood, of course, that the length of the slot in collar portion 68 and of the spring member 66 are so proportioned with relation to the travel of member 58, in performing the clutching operations, that, at all times, the member 66 will have engagement with the walls of the slots above described. Therefore, no matter what the resistance, or lack of resistance, of the parts which are being driven by the shaft 52, upon which member 58 is mounted, still spring 66 will, at all times, be retained in contact with a wall of each slot 67 and 69, so that no chattering would result from continuous tapping, that would take place in the use of any ordinary pin.

For moving member 58 to produce the clutching operations, a suitable control lever 70 is provided. Lever 70 is seen to extend through a slot in panel 22 to provide a handle portion 72, to be grasped by the operator. Preferably, of course, the panel 22 would be marked with suitable indicia to indicate the operative condition of clutch 58. However, to assist in the positive positioning of handle 72 in the operation of clutch 58, spring finger 74 is secured to any desirable fixed point on either the panel 22 or the base casting 14 with respect to the lever 70, and is provided with a plurality of indentations 76, with which a nub (not shown), or any other suitable projecing surface, formed on the under side of the lever 70, is adapted to cooperate to indicate, by the resistance against removal of said nub from said indentations, the positions of lever 70.

At the end of lever 70, opposite the handle portion 72, is suitably mounted, in the preferred construction, a Z-bar 78, one foot 80 of which is mounted on the end of lever 70 and suitably secured thereto, while the leg of the Z extends upwardly from the plane of lever 70 to the plane of the shafts 44 and 52, where the other foot 81 is pivotally mounted, as at 82, upon the body of the uprights 42 and 50, or in any other suitable position, so that the forked spring member 84, which is secured to the foot 81, may engage with the annular groove 86, cut in the collar portion 68. Therefore, by moving the handle portion 72 so that the nub will cooperate with the indentations 76, the member 58 will be moved to cooperate with the other member 56 of the clutch 54 to connect the projection apparatus 6 through the projector drive shaft 52, positively, with the motor 8.

Projector drive shaft 52 extends forwardly of the chassis 2, and, through a removable plate 88, into the gear casing 90. In casing 90 are housed the driving devices, coupled to shaft 52, for transmitting continuous motion in the same direction to the sprockets 92, and 94, and intermittent motion to the sprocket 96, for feeding a film, wound on the reel 98, across the face of panel 22, as set forth more fully in the aforesaid copending application, Serial No. 324,072.

Reel 98, ordinarily known as the feeding reel, is demountably secured upon the end of a shaft 100, for rotation therewith, and retained against removal by the spring catch 102. The shaft 100 passes through panel 22 to be bearinged in suitable standards 104 and 106, preferably cast integral with the base casting 14. A collar 108, secured on shaft 100 to contact with standard 104, retains the shaft against any appreciable end play, while, at the other end of the shaft, are mounted the elements 110 and 112 of a clutch 114, each of which is formed with the irregular tooth formations to provide for positive engagement therebetween. Element 110 comprises merely a collar fixed on shaft 100, while element 112 is formed with a pulley 116 and a collar portion 118 of element 112 which is formed with an annular groove 120 with which cooperates the forked spring member 122 of the clutch shifter 124. A belt 125 is carried on pulley 116 and is, at all times, driven by pulley 62.

Clutch shifter 124 is seen to comprise an arm 126, pivoted at 128. One end of arm 126 carries spring member 122, and the other end is formed as a part of a ball and socket joint, the other part of which is mounted on the actuating handle 130. Handle 130 is adapted to have movement transversely of the chassis 2, and, therefore, to be pushed and pulled inwardly and outwardly of panel 22. Any suitable guide 132 may be provided for handle 130, while an actuator button 134 is secured at the outer end of handle 130.

From the above related structure, it will be noted that during the ordinary operation of feeding film by means of the sprockets 92, 94, and 96, the clutch 114 would be left in the disconnected position, so that the reel 98 could drift with the pull from sprocket 92. However, when it is desired to rewind film, fed through the sprockets above described, the clutch elements 110 and 112 are connected together; the reel 98 is then driven to take up film from the reel 136, which, during the feeding operation, has been operative to take up film from the sprocket 94, in the manner now to be described.

Secured to the shaft 29 is a pulley 138 (Fig. 2) over which is trained a belt 140 to coact with a pulley 142 on the shaft 144, which, as is apparent from Fig. 2, is mounted within suitable bearings in a flange 145, formed integrally with casting 14, and the standard 146, to extend horizontally, and transversely of the chassis 2. It will thus be seen that the pulleys 138 and 142 are disposed substantially at an angle of 90° with respect to each other, and therefore, the belt 140 must be properly arranged to transmit motion between these two pulleys, without flying off. As previously described, the shaft 29 is continuously driven whenever the motor 8 is energized, and, therefore, power will be supplied to the pulley 138 at all times. The belt 140, however, is a spring belt, of small diameter, and, therefore, of small tractive capacity. If, sufficient resistance is applied to the shaft 144, belt 140 will slip over pulleys 138 and 142; in fact, shaft 144 might even be driven in a direction opposite that of the travel of the belt 140, as appears from the operation of the apparatus hereinafter set forth.

Mounted on the end of shaft 144 extending beyond panel 22 is the reel 136, which, normally, is driven to take up film from the sprocket 94, and is, therefore, driven positively by the belt 140 during this time. Reel 136 is secured to shaft 144 in a fashion similar to that in which reel 98 is mounted on shaft 100. A collar 148 on shaft 144, adjacent the standard 146, and a collar 150, adjacent the flange 145 sufficiently fix shaft 144 against longitudinal movement.

After the film has been fully fed to the reel 136, and it is now desired to rewind the film upon the feeding reel 98, it is necessary to train the film over the rewind roller 152 and engage it properly within the reel 98. Then, by moving the clutch shifter 124, the clutch 114 will become operative to transmit power from motor 8 through belt 125 to the reel 98 to wind film off the reel 136 onto reel 98. It is here noted that the reel 136 will continue to be driven by the belt 140 in the same taking-up direction. However, belt 125 is constructed of stiffer material, and may be provided with a larger tractive surface, than belt 140, so that the net effect will be that the film will be drawn off reel 136 onto reel 98, while the belt 140 will slip over the pulleys 138 and 142, with which it is associated, merely applying sufficient resistance to the movement of the reel 138 so that the proper tension will be had on the film in the rewinding operation. Therefore, without removing either reel from the apparatus, the rewinding of the film is fully carried out within the apparatus itself.

In addition to the film feeding and rewinding elements of the projection apparatus 6, which have been so far detailed, the construction herein involves also a novel arrangement whereby the light source of the projection apparatus is mounted for ready accessibility and removal, together with the provision of suitable heat dissipating means for use with such light source. A lamp base 154 is suitably mounted on the casting 14, or, if desired, upon a bracket extending out from the panel 22, so as to provide the necessary electrical connections and support for a light source 156. Light source 156 may, if desired, be encased within a cylindrical heat shield 158, made of any desired heat insulating material, and provided with the heat ventilating openings 160. An opening 162, in the rear side wall of shield 158 is in direct alignment with a reflector 164, so mounted as to direct the concentrated light therefrom through an opening in the front wall of shield 158, and then into the condenser lenses, prisms, and so forth, which form part of the projection system, described in connection with my aforesaid copending application, Serial No. 324,072 the parts of which are here shown in elevation since they do not actively enter into the inventive concept involved.

Projector drive shaft 52 is positioned closely adjacent light source 156, and, at the end thereof closely adjacent the panel 22, is seen to carry the shutter 166, for the purposes well known in the art. It will be noted that the shutter 166 is positioned between the lamp 156 and the condensing lens, etc., of the projection apparatus. Positioned on the shaft 52, in spaced relation to the light source 156, but so that its effect will be felt both at the opening 162, and elsewhere within the cabinet housing the apparatus as hereinafter described is the fan 168, secured on the shaft for rotation therewith at any time the projector is operating.

At this time, it might be noted that the connection between the shaft 29 and the turntable 4, for the driving of the latter, may properly be had through an arrangement such as also described in my copending application Serial No. 324,075, filed Dec. 6, 1928. The arrangement consists in what it is desired to name an over-running clutch 170. The construction includes a gear or ratchet wheel 172, or any other irregularly surfaced member, secured to the shaft 29, above the upper boss 28 of bearing member 26. Turntable 4 rests upon a shoulder 174 on the upper end of shaft 29, and is easily rotatable thereon. Turn-table 4 has secured to the under face thereof, and in position to engage the teeth of the wheel 172, one or more pawls 176, retained in contact with the wheel 172 by means of the springs 178. As seen from Fig. 3, the turn-table 4 may be turned by hand in the normal driven direction of said turntable, when the apparatus is at rest; there can, however, be no reverse movement of the turn-table 4. This arrangement further facilitates the setting-up of the stylus of the reproducing apparatus, as described in the aforesaid copending application Serial No. 324,073 for the purpose of synchronizing the production of talking motion pictures. Overrunning clutch 170, as is clear from the drawing, does not, in any manner, interfere with the active drive of the turn-table 4 from the motor 8.

It is intended that the apparatus disclosed herein, especially the chassis mounting of the entire sound reproducing and motion picture projection apparatus, together with the panel mounting of the controls and of the film feeding mechanism, should be housed within a suitable cabinet. Relative to the mounting of chassis 2 within a cabinet, the disclosure of Figs. 6 to 8 is pertinent. There-in is disclosed a cabinet 186, having the usual doors 188 and 189, swinging toward the sides, the doors and the cabinet being properly ornamented with any desired designs. Chassis 2 is seen to have been mounted upon suitable ledges 192 within cabinet 186, in any desired manner, but preferably, so as to be readily removable therefrom.

It is also desired to protect the film from tearing, due to the negligence of the operator in failing to push the clutch shifter handle 130 inwardly to disconnect the elements 110 and 112. For this purpose an automatic device is provided. The downwardly swinging door 194, hinged to be supported in a position in which it extends horizontally away from the cabinet 186 as in Fig. 6, will properly actuate the button 134 of the clutch shifter 124, when said door is brought up into the closed position in which it would conceal the film reels 98 and 136. The opening 195 in said door permits the projection through said door of light rays from the objective lens 180 of projection apparatus 6.

In Fig. 8 has been disclosed an arrangement of cabinet 186 and chassis 2, whereby the cabinet may have mounted thereon a screen for utilization with the projection apparatus 6. In this combination, the top wall 196 of the cabinet is suitably pivoted at 198 and is provided with any desired means for retaining it in position, when raised, as appears from Fig. 8. The under surface 200 can then be made as a reflecting surface to serve as a screen 202.

Light rays from projection apparatus 6, as apparent from the disclosure, are however directed away from the cabinet, and not in the direction of the screen 202. It is, therefore, necessary to provide some light diverting arrangement for changing the direction of the light rays from the projection apparatus 6 so as to impinge upon the screen 202. For this purpose, the reflector 204, which may take the form of a mirror, or the like, is positioned in front of cabinet 186, in line with the opening 195 in door 194, so that the total distance from reflector 204 to the screen 202 is equal to the focal length of the objective lenses in the projection apparatus 6. Reflector 204 or screen 202 or both, may be tilted to provide an upright, undistorted image on screen 202 or 204; the lenses of the objective may be adjusted so that no tilting of the screen 204 would be necessary.

In order to provide a compact arrangement of the reflector 204 with the other elements of the chassis 2, the under portion of the chassis may have formed therewith, or otherwise provided thereon, the transversely extending guides 206 (Fig. 2). In guides 206 may be supported and guided the extensible and collapsible rods 208 (Figs. 2 and 8), between the outer ends of which is supported the reflector 204, herein shown as taking the form of a flat member, hinged between the rods 208. Reflector 204 is thus foldable down between rods 208, as shown in Figs. 6 and 7, or it may be swung up into operating position, as shown in Fig. 8, for which purpose suitable stops will be provided upon the rods 208 to limit the movement of the reflector.

It is apparent from the arrangement of shafts 32, 44, 52 and 100, that the sound reproducer turntable 4 revolves at all times that motor 8 is in operation. By means of clutches 54 and 114, the shafts 52 and 100 may be brought to rest, while motor shaft 32 is revolving, so that operation of the sound reproducer may be had entirely free from any motion picture projection. On the other hand, even though either of the clutches 54 and 114 are operative to drive the respective shafts to which they are coupled, still the sound reproducer turntable 4 may be permitted to rotate, without any detrimental effect upon the action of the motion picture apparatus. In fact, turntable 4 in such operation, to a slight degree, at least, and insofar as overrunning clutch 170 and worm and gear 46 and 48 permit, provides a continuously connected fly wheel, in addition to fly wheel 51. Such action of turntable 4 and of the drive thereof has no disagreeable effect on the operation of the projection apparatus, since the operation of the driving parts for turntable 4 is essentially noiseless.

It will thus be seen that there are provided devices in which the several objects of this invention are achieved and which are well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

I claim:

1. In a machine for reproducing motion pictures and sound in synchronism, the combination with a base, a motor mounted thereon having a drive shaft, a vertical shaft connected to said drive shaft, a turntable mounted for rotation therewith, a panel mounted at one side of said base, picture projection apparatus mounted on said panel including a pair of reels mounted adjacent the ends of said panel, said panel separating the film handling mechanism from the sound reproducing apparatus, film feeding means located between the centers of said reels, and a gate for the reception of the film, a light source and lens system cooperating with said gate, the parts being so arranged that the film will be fed across the panel from adjacent one end to adjacent the other end of said panel, and operating connections from said projection apparatus to said motor.

2. In a machine for reproducing motion pictures and sound in synchronism, the combination with a base, a motor mounted thereon, a drive shaft connected to said motor, and a turntable rotated from said drive shaft, of a motion picture projection apparatus comprising reels and film feeding apparatus and an operating shaft for said film feeding apparatus mounted in substantial alignment with said drive shaft, and means for connecting the operating shaft and drive shaft together at will.

3. In a machine for reproducing motion pictures and sound in synchronism, the combination with a base, a motor mounted thereon, a drive shaft connected to said motor, a turntable driven from said drive shaft, a motion picture projection apparatus comprising reels and film feeding apparatus and an operating shaft therefor, the operating shaft for said film feeding apparatus being mounted in substantial alignment with said drive shaft, means for connecting the operating shaft and drive shaft together at will, operating shafts for both of said reels located at opposite sides of said drive shaft, means for connecting one of said reel operating shafts to said drive shaft at will, and means for connecting the other of said reel operating shafts to said drive shaft.

4. A machine for reproducing motion pictures and sound in synchronism, in combination, a drive shaft, a phonograph turntable positively driven by said shaft, a film reeling device slippingly connected to said drive shaft, a second film reeling device adapted to be connected to said drive shaft at will, and film feeding devices disconnectibly driven by said drive shaft.

5. In a machine for reproducing motion pictures and sound in synchronism, the combination with a base, a motor, a phonograph turntable mounted on the base and operatively connected to the motor, a panel mounted on said base and extending thereacross, picture projection apparatus secured to said panel and said base, including film feeding mechanism and reels for said film, operating connections between the projection apparatus and said motor, the whole of said apparatus being located within the perimeter of said panel.

6. In a machine for reproducing motion pictures and sound in synchronism, the combination with a base, a motor, a phonograph turntable mounted on the base and operatively connected to the motor, a panel mounted on said base, picture projection apparatus mounted adjacent said panel comprising film feeding and take-up reels rotatably mounted on one side of the panel and parallel thereto, film feeding mechanism operatively connected to said motor and mounted between the centers of said reels and operating in the same plane as said reels so as to feed the film from one reel to the other, said panel arranged to form a partition between said turntable and said picture projection apparatus.

7. A machine for reproducing motion pictures and sound in synchronism comprising, in combination, a cabinet having a support within the cabinet, a movable cover, a door and a panel, a unitary and readily portable base positioned within the cabinet on said support adjacent said cover and door, a motor, a shaft mounted on said base and operatively connected to said motor, a sound record carrier mounted on said shaft so as to be accessible through said cover, motion picture projection apparatus carried by said base and comprising film feeding mechanism mounted so as to be accessible through said door, an operating shaft therefor mounted on said base, operating connections between said operating shaft and said motor, a take-up reel, a shaft therefor rotatably mounted on said base, operating connections between the reel shaft and the motor, a second reel, a light source and a lens system all carried by said base and positioned with respect to said panel so that the reels and the film feeding mechanism are separated by the panel from the turntable and the drive mechanism therefor.

8. A machine for reproducing motion pictures and sound in synchronism comprising, in combination, a cabinet having a support within the cabinet, a movable cover and a door, a unitary and readily portable base positioned within the cabinet on said support adjacent said cover and door, a motor, a shaft mounted on said base and operatively connected to said motor, a sound record carrier mounted on said shaft so as to be accessible through said cover, motion picture projection apparatus carried by said base and comprising film feeding mechanism mounted so as to be accessible through said door, an operating shaft therefor, mounted on said base operating connections between said operating shaft and said motor, a take-up reel and a feeding reel mounted on opposite sides of said feeding mechanism so as to be accessible through said door, a shaft for the take-up reel rotatably mounted on said base, operating connections between the reel shaft and the motor, and a light source and lens system also carried by said base, the base and mechanism mounted thereon being removable as a unit.

9. A machine for reproducing motion pictures and sound in synchronism comprising, in combination, a cabinet having a support within the cabinet arranged to form a compartment, a movable closure and a door, a base positioned within the cabinet on said support, a motor, a shaft mounted on said base and operatively connected to said motor, a sound record carrier mounted on said shaft so as to be accessible through said closure member, a panel mounted in said cabinet across the front of said compartment, motion picture projection apparatus mounted adjacent said panel including film feeding mechanism and take-up and feeding reels mounted in front of said panel so as to be accessible through said door and separated from the sound record mechanism, operating connections from the film feeding mechanism and take-up reel to said motor and a light source and lens system cooperating with the film feeding mechanism to project the pictures.

10. In a machine for reproducing motion pictures and sound in synchronism, the combination comprising a cabinet having a support therein arranged to form a compartment, a unitary and readily portable base adapted to be positioned within the cabinet on said support, a motor, a phonograph turntable mounted on the base and operatively connected to the motor, a panel mounted on the base and extending thereon so that when the base is positioned in the cabinet the panel at least partly closes the compartment, picture projection apparatus mounted adjacent said panel comprising film feeding mechanism and take-up and feeding reels mounted in front of said panel so as to be separated from said turntable and accessible, operating mechanism therefor mounted on said base in rear of said panel and operating connections from said mechanism to said motor.

11. In a machine for reproducing motion pictures and sound in synchronism, the combination comprising a cabinet having a support therein arranged to form a compartment, a unitary and readily portable base adapted to be positioned within the cabinet on said support, a motor, a phonograph turntable mounted on the base and operatively connected to the motor, a panel mounted on the base and extending thereon so that when the base is positioned in the cabinet the panel at least partly closes the compartment, picture projection apparatus mounted adjacent said panel comprising film feeding mechanism and takeup and feeding reels mounted in front of said panel so as to be separated from said turntable and accessible, operating mechanism therefore mounted on said base in rear of said panel and operating connections from said mechanism to said motor, a screen carried by said cabinet and means also carried by said cabinet for directing the picture onto said screen.

12. A machine for reproducing motion pictures and sound in synchronism and compactly arranged to be readily portable as a unit comprising, in combination, a supporting base, a drive shaft rotatably mounted on said base, a motor, operating connections therefrom to said drive shaft, a second shaft mounted on said base and operatively connected to said drive shaft, a sound record carrier mounted on said second shaft, picture projector apparatus carried by said base and comprising film feeding mechanism, an operating shaft therefor mounted on said base, operating connections between said operating shaft and said drive shaft, a take-up reel, a shaft therefor, operating connections between the reel shaft and the drive shaft, a second reel, a light source and a lens system, all of which are also carried by said base.

13. A machine for reproducing motion pictures and sound in synchronism and compactly arranged to be readily portable as a unit comprising, in combination, a supporting base, a drive shaft rotatably mounted on said base, a motor, operating connections therefrom to said drive shaft, a second shaft mounted on said base and operatively connected to said drive shaft, a sound record carrier mounted on said second shaft, picture projector apparatus carried by said base and comprising film feeding mechanism, an operating shaft therefor mounted on said base, operating connections between said operating shaft and said drive shaft, a take-up reel, a shaft therefor, operating connections between the reel shaft and the drive shaft, a second reel, a shaft therefor mounted on said base, operating connections therefrom to said drive shaft and including a movable clutch whereby the second reel may be selectively driven so as to rewind the film, a light source and a lens system, all of which are also carried by said base.

14. In a machine for reproducing motion pictures and sound in synchronism, the combination with a base, a motor mounted thereon having a drive shaft, a vertical shaft mounted at the rear of said base and connected to said drive shaft, a turntable mounted for rotation therewith, a panel mounted on said base at the front thereof, picture projection apparatus mounted adjacent said panel including film feeding mechanism mounted in front of said panel, operating shafts extending therefrom, connections from said operating shafts to said drive shaft and a source of light mounted rearwardly of said panel, whereby the source of light and the drive mechanism are separated from the film feeding mechanism.

15. A machine for reproducing motion pictures and sound in synchronism comprising a cabinet having a door; a supporting base mounted within the cabinet; a motor; a shaft mounted on said base and operatively connected to said motor, a sound record carrier mounted on said shaft and accessible through an opening in said cabinet, and a sound reproducer carried by said cabinet; picture projection apparatus mounted in said cabinet and comprising film feeding mechanism, an operating shaft therefor operatively connected to said motor, a take-up reel, a shaft therefor operatively connected to said motor, a second reel, a light source and a lens system, the film handling mechanism being mounted so as to be exposed and accessible for the changing of films when said door is opened, and means for separating the film handling mechanism from the operating mechanism for the sound apparatus; a screen carried by said cabinet and means for maintaining the screen and picture projection apparatus in predetermined cooperative relationship with the picture directed upon the screen.

16. A machine for reproducing motion pictures and sound in synchronism, comprising a cabinet having a compartment therein, openings from said compartment to the exterior, a motor mounted in said compartment, sound reproducer apparatus mounted in said cabinet, operating connections between said motor and sound reproducer, picture projection apparatus mounted in said cabinet and having at least the film reels and film feeding mechanism thereof permanently mounted outside said compartment, operating connections between said motor and projection apparatus, means for separating the projection apparatus from the sound reproducer, a screen carried by said cabinet, and a mirror located between said projection apparatus and screen for directing the pictures onto said screen.

17. A machine for reproducing motion pictures and sound in synchronism comprising, in combination, a cabinet having a compartment therein, openings from said compartment to the exterior, a motor mounted in said cabinet, sound reproducer apparatus mounted in said cabinet, operating connections between said motor and sound reproducer, picture projection apparatus mounted in said cabinet, operating connections between said motor and projection apparatus, means for separating the projection apparatus from the sound reproducer, and a propeller type air circulating fan operatively connected to be rotated by one of said operating connections to ventilate said compartment through said openings.

18. A machine for reproducing motion pictures and sound in synchronism comprising, in combination, a cabinet having a compartment therein, openings from said compartment to the exterior, a motor mounted in said cabinet, sound reproducer apparatus mounted in said cabinet, an operating shaft between said motor and sound reproducer, picture projection apparatus mounted in said cabinet, an operating shaft between said motor and projection apparatus, means for separating the projection apparatus from the sound reproducer, a fan mounted upon one of said operating shafts to be rotated therewith so as to ventilate said compartment through said openings.

In testimony whereof I affix my signature.

FERDINAND von MADALER.